United States Patent
Stacey et al.

(10) Patent No.: US 10,630,456 B2
(45) Date of Patent: *Apr. 21, 2020

(54) WIRELESS DEVICE, METHOD, AND COMPUTER-READABLE MEDIA FOR TRANSMITTING AND RECEIVING HIGH-EFFICIENCY SIGNAL FIELDS

(71) Applicant: Intel IP Corporation, Santa Clara, CA (US)

(72) Inventors: Robert J. Stacey, Portland, OR (US); Shahrnaz Azizi, Cuperino, CA (US)

(73) Assignee: Intel IP Corporation, Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/840,776

(22) Filed: Dec. 13, 2017

(65) Prior Publication Data
US 2018/0198591 A1 Jul. 12, 2018

Related U.S. Application Data

(63) Continuation of application No. 14/579,865, filed on Dec. 22, 2014, now Pat. No. 9,871,644.
(Continued)

(51) Int. Cl.
*H04L 5/00* (2006.01)
*H04W 84/12* (2009.01)
(Continued)

(52) U.S. Cl.
CPC .......... *H04L 5/0091* (2013.01); *H04L 5/0053* (2013.01); *H04W 84/12* (2013.01);
(Continued)

(58) Field of Classification Search
CPC . H04L 5/0053; H04L 5/0091; H04L 27/2601; H04W 84/12; H04W 88/02; H04W 88/12
See application file for complete search history.

(56) References Cited

U.S. PATENT DOCUMENTS 7,590,078 B2   9/2009  Nanda
8,743,784 B2   6/2014  Sampath et al.
(Continued)

FOREIGN PATENT DOCUMENTS

TW        201608927 A      3/2016
WO    WO-2013129861 A1    9/2013
WO    WO-2016028368 A1    2/2016

OTHER PUBLICATIONS

"U.S. Appl. No. 14/579,865, Non Final Office Action dated Apr. 17, 2017", 16 pgs.
(Continued)

*Primary Examiner* — Alpus Hsu
(74) *Attorney, Agent, or Firm* — Schwegman Lundberg & Woessner, P.A

(57) ABSTRACT

Wireless devices, methods, and computer-readable media for transmitting and receiving high-efficiency signal fields. An access point (AP) may include circuitry configured to determine a high-efficiency signal (HE-SIG) field for each of a plurality of sub-channels, wherein each HE-SIG field includes a common part and a sub-channel specific part. The circuitry may be further configured to transmit, in accordance with orthogonal frequency division multiple access (OFDMA), on each of the plurality of sub-channels, a corresponding HE-SIG field as a preamble to a physical layer convergence protocol (PLCP) protocol data unit (PPDU), wherein the sub-channel specific part of the corresponding HE-SIG field includes a resource map field that enables a HEW device to determine which portion of the PPDU to demodulate, and wherein the common portion includes information of a format of the PPDU. A HEW device may include circuitry configured to demodulate a PPDU based on a HE-SIG field.

24 Claims, 5 Drawing Sheets

300

| | INFORMATION | NUMBER OF BITS | NOTES |
|---|---|---|---|
| COMMON FIELDS 302 | BW 306 | 2 | |
| | GI 308 | 2 | |
| | DURATION 310 | 8 | MAY BE NECESSARY IF L-SIG IS NOT RELIABLE |
| PER SUB-CHANNEL FIELDS 304 | PBSSID 312 | 4 | |
| | OFDMA/SDMA 314 | 1 | |
| | RESOURCE MAP 317 — OFDMA 316 | 67 OR 68 | PAID+MCS PER USER FOR OFDMA AND OPTIONAL PARTIAL OFDMA |
| | RESOURCE MAP 317 — SDMA 318 | 68 | PAID+NSTS+MCS PER USER FOR SDMA |
| | CRC 320 | 6 | |
| | TAIL 322 | 6 | |

Related U.S. Application Data

(60) Provisional application No. 62/039,249, filed on Aug. 19, 2014.

(51) Int. Cl.
  *H04W 88/02* (2009.01)
  *H04W 88/12* (2009.01)
  *H04L 27/26* (2006.01)

(52) U.S. Cl.
  CPC ........... *H04W 88/02* (2013.01); *H04W 88/12* (2013.01); *H04L 27/2601* (2013.01)

(56) References Cited

U.S. PATENT DOCUMENTS

| | | |
|---|---|---|
| 8,797,836 B2 | 8/2014 | Zhang et al. |
| 8,842,657 B2 | 9/2014 | Walton et al. |
| 8,848,680 B2 | 9/2014 | Lee |
| 8,873,582 B2 | 10/2014 | Noh |
| 9,144,099 B2 | 9/2015 | Kang et al. |
| 9,398,123 B2 | 7/2016 | Vermani et al. |
| 9,647,816 B2 * | 5/2017 | Yu .................. H04L 5/0048 |
| 9,853,784 B2 * | 12/2017 | Azizi ................. H04L 5/0035 |
| 9,871,644 B2 | 1/2018 | Stacey et al. |
| 2011/0255620 A1 | 10/2011 | Jones, IV et al. |
| 2013/0003628 A1 | 1/2013 | Christin et al. |
| 2013/0286959 A1 | 10/2013 | Lou et al. |
| 2013/0329620 A1 | 12/2013 | Kim et al. |
| 2014/0086200 A1 | 3/2014 | Seok |
| 2014/0211775 A1 | 7/2014 | Sampath et al. |
| 2015/0071272 A1 | 3/2015 | Vermani et al. |
| 2015/0163028 A1 * | 6/2015 | Tandra ................. H04L 5/0037 370/203 |
| 2015/0207599 A1 | 7/2015 | Kim et al. |
| 2016/0037441 A1 | 2/2016 | Li et al. |
| 2016/0050052 A1 | 2/2016 | Suh et al. |
| 2016/0050622 A1 | 2/2016 | Azizi et al. |
| 2016/0056943 A1 | 2/2016 | Stacey et al. |
| 2016/0066338 A1 * | 3/2016 | Kwon .................. H04L 5/0007 370/330 |
| 2016/0143010 A1 | 5/2016 | Kenney et al. |
| 2016/0353370 A1 * | 12/2016 | Choi .................. H04L 27/2613 |

OTHER PUBLICATIONS

"U.S. Appl. No. 14/579,865, Non Final Office Action dated Aug. 18, 2016", 12 pgs.

"U.S. Appl. No. 14/579,865, Notice of Allowance dated Sep. 7, 2017", 7 pgs.

"U.S. Appl. No. 14/579,865, Response filed Jan. 25, 2017 to Non Final Office Action dated Aug. 18, 2016", 11 pgs.

"U.S. Appl. No. 14/579,865, Response filed Aug. 16, 2017 to Non Final Office Action dated Apr. 17, 2017", 13 pgs.

"International Application Serial No. PCT/US2015/035310, International Preliminary Report on Patentability dated Mar. 2, 2017", 10 pgs.

"International Application Serial No. PCT/US2015/035310, International Search Report dated Sep. 25, 2015", 3 pgs.

"International Application Serial No. PCT/US2015/035310, Written Opinion dated Sep. 25, 2015", 8 pgs.

"Taiwanese Application Serial No. 104122170, Office Action dated Mar. 27, 2017", W/ English Translation, 13 pgs.

"Taiwanese Application Serial No. 104122170, Response Filed Sep. 25, 2017 to Office Action dated Mar. 27, 2017", (W/ English Claims), 64 pgs.

* cited by examiner

| | INFORMATION | NUMBER OF BITS | NOTES |
|---|---|---|---|
| COMMON FIELDS 302 | BW 306 | 2 | |
| | GI 308 | 2 | |
| | DURATION 310 | 8 | MAY BE NECESSARY IF L-SIG IS NOT RELIABLE |
| PER SUB-CHANNEL FIELDS 304 | PBSSID 312 | 4 | |
| | OFDMA/SDMA 314 | 1 | |
| | RESOURCE MAP 317 — OFDMA 316 | 67 OR 68 | PAID+MCS PER USER FOR OFDMA AND OPTIONAL PARTIAL OFDMA |
| | RESOURCE MAP 317 — SDMA 318 | 68 | PAID+NSTS+MCS PER USER FOR SDMA |
| | CRC 320 | 6 | |
| | TAIL 322 | 6 | |

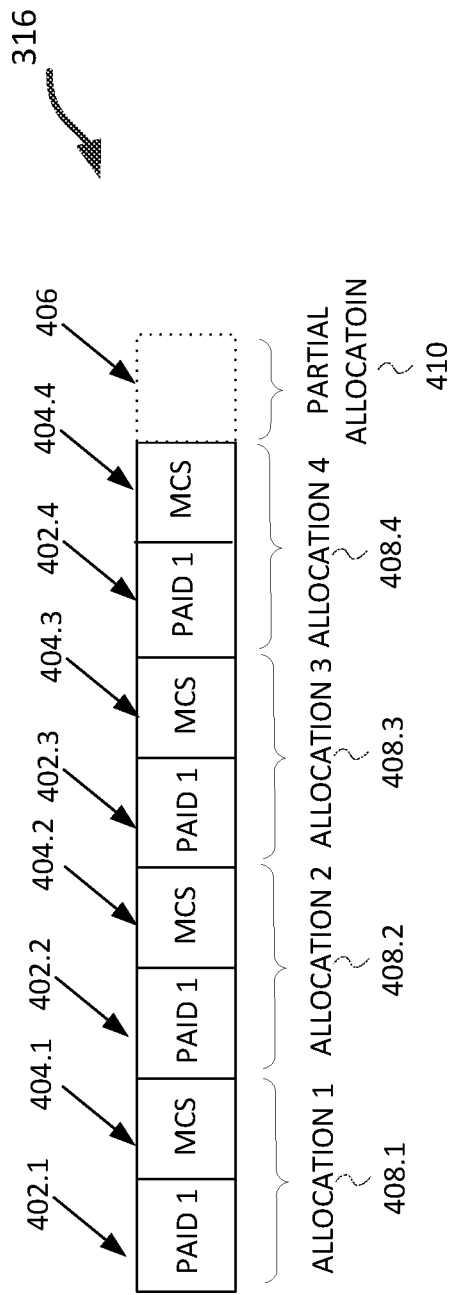
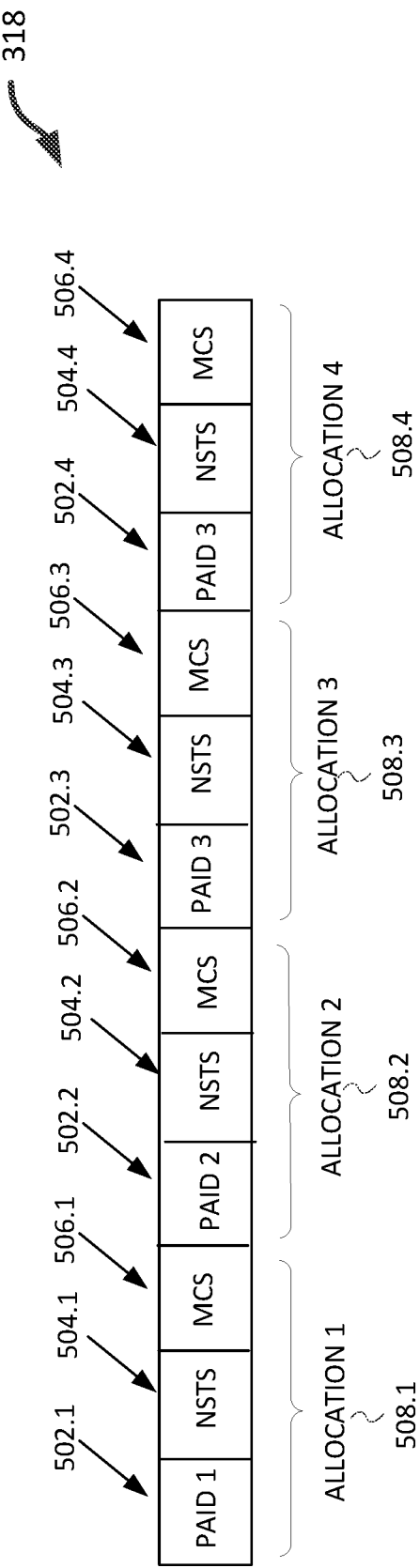
FIG. 4
FIG. 5

WIRELESS DEVICE, METHOD, AND COMPUTER-READABLE MEDIA FOR TRANSMITTING AND RECEIVING HIGH-EFFICIENCY SIGNAL FIELDS

PRIORITY CLAIM

This application is a continuation of U.S. patent application Ser. No. 14/579,865, filed Dec. 22, 2014, which claims the benefit of priority under 35 USC 119(e) to U.S. Provisional Patent Application Ser. No. 62/039,249, filed Aug. 19, 2014 [reference number P71591Z] each of which is incorporated herein by reference in its entirety.

TECHNICAL FIELD

Embodiments pertain to wireless communications. Some embodiments relate to transmitting and receiving signal fields in 802.11, some embodiments relate to transmitting and receiving signal fields in orthogonal frequency division multiple access (OFDMA), and some embodiments to transmitting and receiving signal fields in 802.11ax.

BACKGROUND

One issue with communicating data over a wireless network is transmitting and receiving signal fields. Often stations (STA) need to receive signal fields from access points (APs) to receive downlink packets properly.

Another issue with communicating data over a wireless network is that often more than one standard may be in use in a wireless local-area network (WLAN). For example, Institute of Electronic and Electrical Engineers (IEEE) 802.11ax, referred to as High Efficiency Wireless local-area network (HEW) may need to be used with legacy versions of 802.11.

Thus there are general needs for systems and methods that allow access points to transmit signal fields and STAs to receive signal fields. There are also general needs for systems and methods that allow HEW devices to coexist with legacy devices.

BRIEF DESCRIPTION OF THE DRAWINGS

The present disclosure is illustrated by way of example and not limitation in the figures of the accompanying drawings, in which like references indicate similar elements and in which:

FIG. 4 illustrates an OFDMA resource map according to example embodiments;

FIG. 5 illustrates a space-division multiple access (SDMA) resource map according to example embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
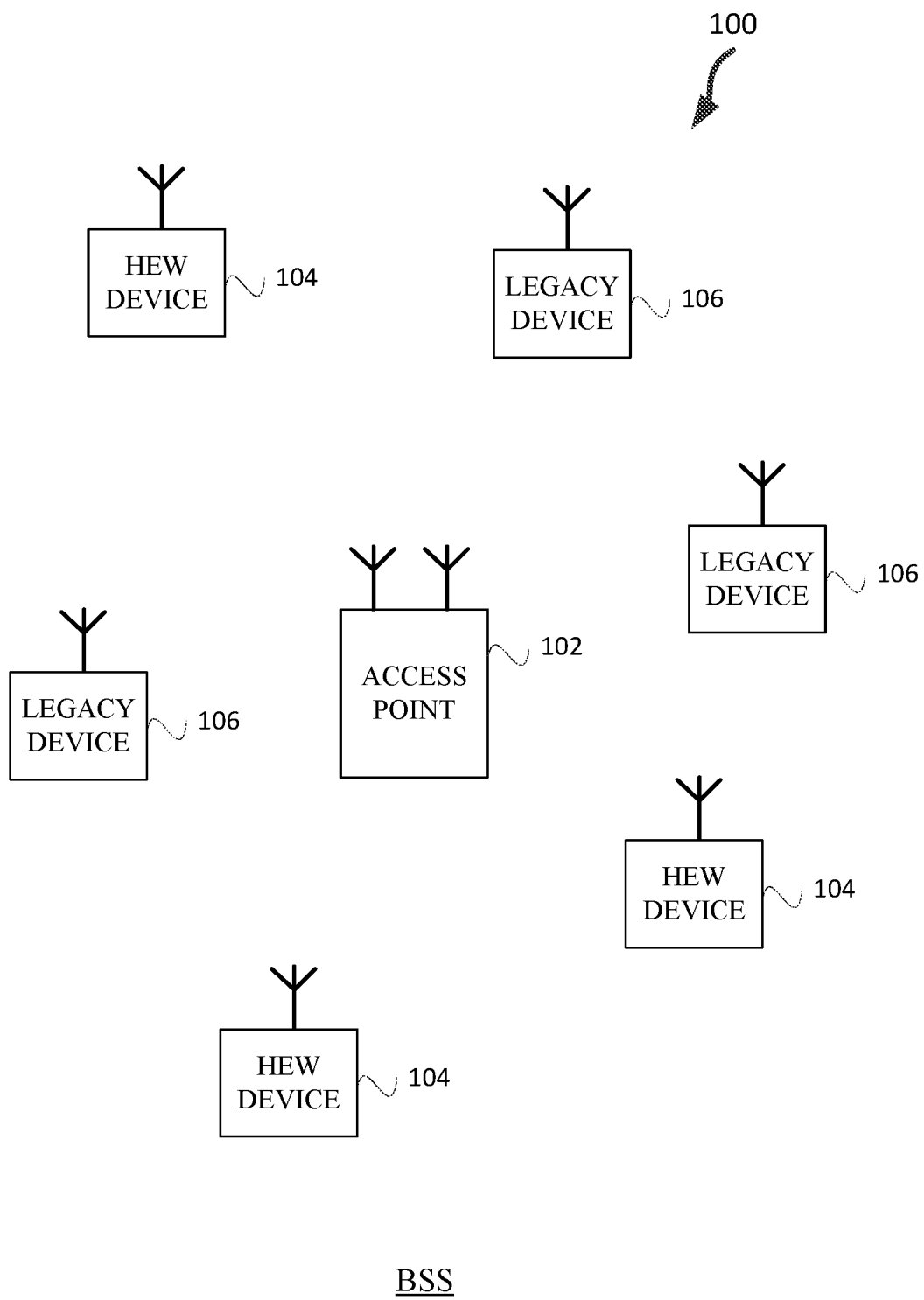
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include an access point (AP) 102, a plurality of high-efficiency wireless (HEW) (e.g., IEEE 802.11ax) devices 104 and a plurality of legacy (e.g., IEEE 802.11n/ac) devices 106. In example embodiments, a HEW device 104 may be called a HE device, HE Wi-Fi device, wireless device, or a wireless communications device.

The AP 102 may be an access point (AP) using the 802.11 to transmit and receive. The AP 102 may be a base station. The AP 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 may include a multiple access technique that may be a space-division multiple access (SDMA) technique such as multi-user (MU) multiple-input and multiple-output (MIMO)(MU-MIMO).

The HEW devices 104 may operate in accordance with 802.11ax or another standard of 802.11. The legacy devices 106 may operate in accordance with one or more of 802.11 a/b/g//n/ac, or another legacy wireless communication standard.

The HEW devices 104 may be wireless-transmit-and-receive devices such as a cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and zero or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.5 MHz, 5 MHz and 10 MHz or a combination thereof may also be used. A HEW frame may be configured for transmitting a number of spatial streams.

In other embodiments, the AP 102, HEW device 104, and/or legacy device 106 may also implement different technologies such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In an orthogonal frequency division multiplexing (OFDM) system (e.g., 802.11ax), an associated HEW device 104 may operate on different sub-channels, which may be 20 MHz, of the BSS 100 (that can operate for example at 80 MHz). In OFDMA, multiple HEW devices 104 and/or legacy devices 106 may operate at the same time on different sub-channels. The HEW device 104 may enter a power save mode, and upon coming out of power save mode, the HEW device 104 may need to re-synchronize with the BSS 100 by receiving a beacon. If a beacon is transmitted only on the primary channel, then HEW device 104 needs to move and tune to the primary channel upon waking up to be able to receive beacons. Then the HEW device 104 needs to re-tune back to its operating sub-channels, which may be 20 MHz, or it has to follow a handshake procedure to let AP 102 know of a new operating sub-channel. The HEW device 104 may risk losing some frames during the channel switch, in example embodiments.

In example embodiments, the HEW device 104 is configured to transmit and receive beacon frames according to one or more of the embodiments disclosed herein in conjunction with FIGS. 1-6.

Some embodiments relate to high-efficiency wireless communications including high-efficiency WLAN and high-efficiency wireless (HEW) communications. In accordance with some IEEE 802.11ax (High-Efficiency WLAN (HEW)) embodiments, an AP 102 may operate as a master station, which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional WLAN communications in which devices communicate in accordance with a contention-based communication technique rather than a multiple access technique. During the HEW control period, the AP 102 may communicate with HEW devices 104 using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a TDMA technique or a frequency division multiple access (FDMA) technique. In some embodiments, the multiple access technique may be a SDMA technique.

The master station may also communicate with legacy stations in accordance with legacy IEEE 802.11 communication techniques. In some embodiments, the master station may also be configurable to communicate with HEW devices 104 outside the HEW control period in accordance with legacy IEEE 802.11 communication techniques, although this is not a requirement.

Figures 2, 3:
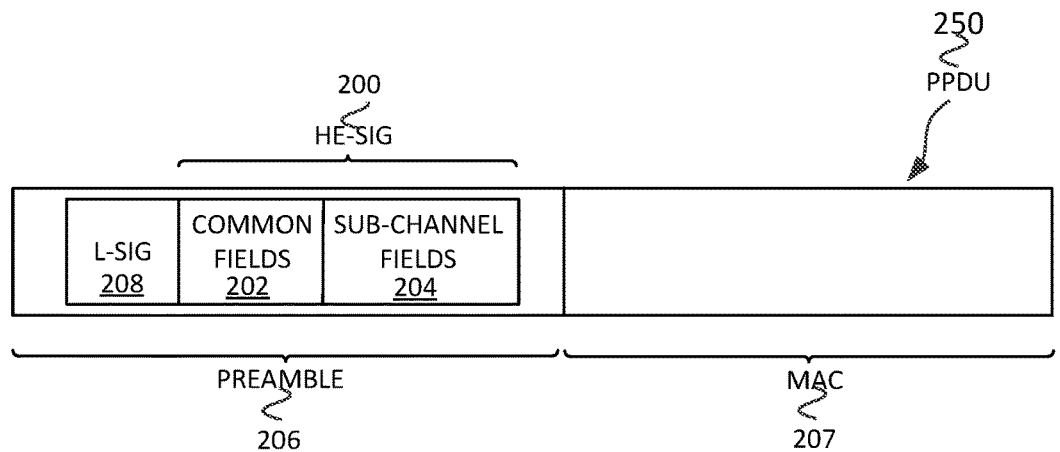
FIG. 2 illustrates a high-efficiency signal field (HE-SIG) according to example embodiments.
FIG. 3 illustrates a table with fields for the common fields and the per sub-channel fields of the HE-SIG of FIG. 2, according to example embodiments.

FIG. 2 illustrates a high-efficiency signal (HE-SIG) field 200, according to example embodiments. The HE-SIG field 200 may include common fields 202 and per sub-channel fields 204. The common fields 202 may include information regarding the overall format of high-efficiency physical protocol data unit (HE PPDU), and the per sub-channel fields 204 may include information that allows HEW devices 104 that are operating on the sub-channel on which the HE-SIG field 200 is transmitted to determine which portion of the PPDU to demodulate. In example embodiments, the HE-SIG 200 is used in conjunction with IEEE 802.11ax. In example embodiments, the HE-SIG 200 is a field that appears in the preamble of the HE PPDU for IEEE 802.11 such as IEEE 802.11ax.

In example embodiments, the HE-SIG 200 is encoded separately for each sub-channel such as a 20 MHz sub-channel, which may enable HEW devices 104 with varying operating bandwidths (e.g., 20 MHz, 40 MHz, 80 MHz, or 160/80+80 MHz) to receive the HE-SIG 200 without tuning to a new bandwidth or sub-channel. The HE-SIG 200 may be transmitted from the AP 102 to one or more HEW devices 104 simultaneously on different sub-channels. The HE-SIG 200 may be encoded separately on each 20 MHz sub-channel. In example embodiments, the HE-SIG 200 has a fixed size irrespective of a number of allocated HEW devices 104 in the BSS 100.

FIG. 3 illustrates a table 300 with fields for the common fields 302 and the per sub-channel fields 304 of the HE-SIG 200 of FIG. 2, according to example embodiments. The common fields 302 may include bandwidth (BW) 306, guard interval (GI) 308, and duration 310. The BW 306 may indicate a bandwidth of the PPDU. The BW 306 may be 2 bits to indicate four possible bandwidths. For example, the BW 306 may indicate that the bandwidth is 20 MHz, 40 MHz, 80 MHz, or 160 MHz. In example embodiments, the number of bits used to indicate the BW 306 may be more than 2 bits.

The GI 308 may indicate a guard interval that may be indicated with 2 bits. For example, the GI 308 may indicate that the guard interval is 400 ns. In example embodiments the GI 308 may be indicated with fewer or more bits.

The duration 310 may include 8 bits and may indicate a duration of the PPDU. The duration 310 may indicate a number of symbols of the PPDU, or alternatively a time, such as 16 μs. In example embodiments, the duration 310 is not included when a long-signal (L-SIG) field, which is part of the legacy-compatible preamble that precedes the HE-SIG 200 in the PPDU, is used for the duration field. For 4× symbol or if coding 16 μs units, 8 bits would be sufficient to indicate a PPDU duration 310 of up to 4 ms. In example embodiments, the duration field may be a different number of bits.

The per sub-channel fields 304 may include a PBSSID 312, an OFDMA/SDMA 314, an OFDMA resource map 316, a resource map 317, an SDMA resource map 318, a CRC 320, and a tail 322. The partial BSS identification (PBSSID) 312 may be 4 bits and may be an encoding of the BSS 100 (FIG. 1) identification (BSSID), which identifies which BSS 100 the HE-SIG 200 belongs to. The BSSID may be 48 bits according to IEEE 802.11 standards. The PBSSID 312 may be 32 bits and spread across multiple sub-channels. For example, 4 bits may be transmitted on each of 8 sub-channels.

The PBSSID 312 may be a 32 bit hash of the full 48 bits of the BSSID. The bits of the PBSSID 312 may then be spread across the multiple HE-SIGs 200 as indicated in Table 1.

TABLE 1

EXAMPLE ENCODING OF PBSSID

PBSSID_ch1[0:3] = PBSSID [0:3]
PBSSID_ch2[0:3] = PBSSID [4:7]
PBSSID_ch3[0:3] = PBSSID [8:11]
PBSSID_ch4[0:3] = PBSSID [12:15]
PBSSID_ch5[0:3] = PBSSID [16:19]
PBSSID_ch6[0:3] = PBSSID [20:23]
PBSSID_ch7[0:3] = PBSSID [24:27]
PBSSID_ch8[0:3] = PBSSID [28:31]

PBSSID_ch1 indicates the PBSSID 312 for a HE-SIG 200 for channel 1, which may be 20 MHz. As illustrated in Table 1, the PBSSID 312 is encoded for a 160 MHz. If the operating frequency for the wireless medium is only 80 MHz, then only the first four entries may be used. The HEW devices 104 may receive one or more of the partial PBSSIDs and determine whether there is a match with the hashed full PBSSID. If there is a match, then the HE-SIG 200 may be part of the BSS 100 of the HEW device 104. The HEW device 104 needs to examine additional information in the PPDU before the HEW device 104 is certain the PPDU is intended for the HEW device 104. A partial PBSSID 312 may provide the benefit that the HEW device 104 can determine with fewer bits if a PPDU is not intended for the HEW device 104 because the PPDU is from a neighboring BSS (not illustrated). In example embodiments, the full BSSID is included in the HE-SIG 200. In example embodiments, the PBSSID 312 is not included in the HE-SIG 200.

The CRC 320 may be a cyclic redundancy check for the packet. The tail 322 may clear compression or other processing of the packet. The OFDMA/SDMA 314 may be one bit to indicate whether the resource map 317 is for an OFDMA resource map 316 field or for a SDMA resource map 318 field. In example embodiments, each sub-channel, which may be 20 MHz, supports either the OFDMA resource map 316 or the SDMA resource map 318. FIG. 4 illustrates an example embodiment of the OFDMA resource map 316 and FIG. 5 illustrates an example embodiment of a SDMA resource map 318.

FIG. 4 illustrates an OFDMA resource map 316 according to example embodiments. The OFDMA resource map 316 may be for one sub-channel that may be 20 MHz. Illustrated in FIG. 4 are four allocations 408 (408.1-408.4) and one partial allocation 410. Each allocation 408 may include a partial association identification (PAID) 402 and modulation and coding set (MCS) 404. The PAID 402 may be an indication of an association identification (AID) of a HEW device 104 associated with an AP 102. The MCS 404 may be a modulation and coding set for the sub-channel. The position of the allocation 408 in the OFDMA resource map 316 may identify the portion of the sub-channel the allocation 408 is for. For example, allocation 1 408.1 may be for the first 5 MHz of the sub-channel, allocation 2 408.2 may be for the second 5 MHz of the sub-channel, allocation 3 408.3 may be for the third 5 MHz of the sub-channel, and allocation 4 408.4 may be for the fourth 5 MHz of the sub-channel. The PAIDs 402 may be duplicated so that a HEW device 104 may be allocated a multiple of one quarter of the sub-channel, or, for a 20 MHZ sub-channel, 5 MHz, 10 MHz, 15 Mhz, or 20 MHz.

The partial allocation 410 may optionally be included. The partial allocation 410 may be a partial allocation 410 for another sub-channel or portion of the wireless medium. For example, referring to FIG. 6, the partial allocation 410 may be one-half of the allocation for channel 17 610.1, 610.4, 610.7, and 610.10, which may be a use of beacon or inter-channel tones as an allocation 410. For example, the OFDMA resource map 316 (of FIG. 4) may be for tone 1 610.2, tone 2 610.3, tone 3 610.5, and tone 4 610.6, and include one half the allocation of the tone 17 610.1, 610.4, 610.7, and 610.10. An OFDMA resource map 316 (not illustrated in FIG. 6) for tone 5 610.8, tone 6 610.9, tone 7 610.11, and tone 8 610.12 may include the second half of the allocation of the tone 17 610.1, 610.4, 610.7, and 610.10.

Referring again to FIG. 4, the PAIDs 402 may be encoded as follows. PAIDs 402 may be 11 bits. The association identification (AID) is 14 bits in accordance with some 802.1 standards. The AP 102 assigns the AID to the HEW device 104 or legacy device 106 when the HEW device 104 or legacy device 106 associates with the BSS 100. The PAID 402 may be determined with the AID=PAID+offset, where the offset is a random offset. The AIDs are allocated by the AP 102 sequentially from the offset. So, the PAID 402 may be determined by the AP 102 and communicated to the HEW device 104. The 11 bits of the PAID 402 is large enough to accommodate the two-thousand and seven (2,007) STAs that some versions of IEEE 802.11 require the BSS 100 to support. In example embodiments, the PAID 402 may be the full AID. In example embodiments, the PAID 402 may be another encoding of the AID that requires fewer bits than the AID.

FIG. 5 illustrates a SDMA resource map 318 according to example embodiments. The SDMA resource map 318 may be 68 bits with 17 bits for each of four allocations 508 (508.1-508.4). There may be up to four HEW devices 104 specified in the SDMA resource map 318. Each allocation 508 may include 11 bits (PAID) 502+2 bits for a number of spatial streams (NSTS) 504+4 bits (MCS) 506=17 bits per allocation 508.

The partial association identifications (PAIDs) 502 may be as described in conjunction with FIG. 4. The NSTS 504 may be the number of spatial streams for the HEW device 104 indicated by the NSTS 504. The order of the PAIDs 502 may indicate to the HEW device 104 which spatial streams are allocated to the HEW device 104 from an order of spatial streams according to one or more standards. The MCSs 506 may be 4 bits to indicate the MCS 506.

Figure 6:
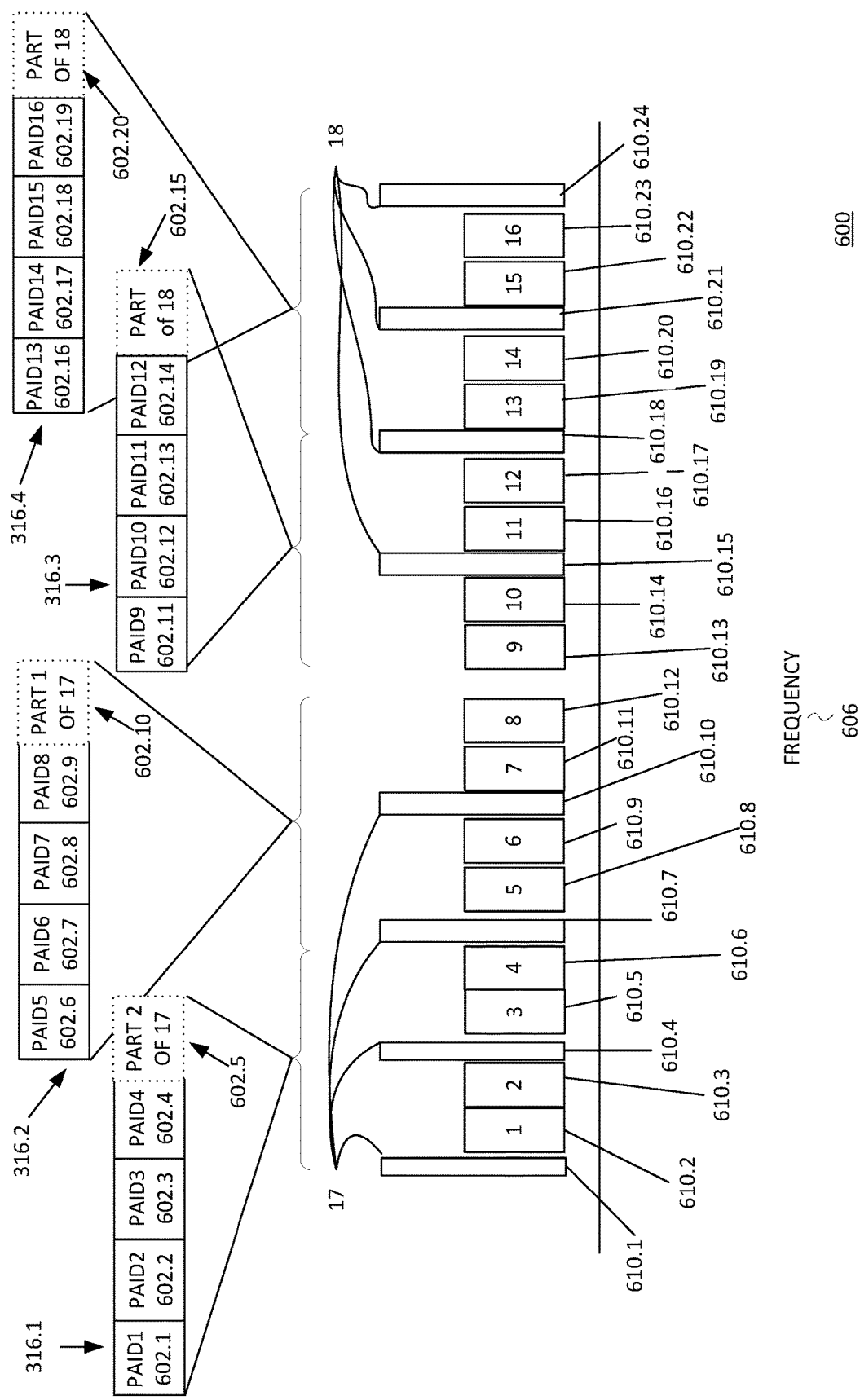
FIG. 6 illustrates an example of an allocation of sub-channels according to example embodiments.

FIG. 6 illustrates an example of an allocation of sub-channels according to example embodiments. Frequency 606 is illustrated along the horizontal axis with 16 contiguous 5 MHz sub-channels, 1 (610.2) through 16 (610.23). There are also two 5 MHz non-contiguous sub-channels 17 (610.1, 610.4, 610.7, and 610.10) and 18 (610.15, 610.18, 610.21, and 610.24). Illustrated along the top are four OFDMA resource maps 316.1, 316.2, 316.2, and 316.4. The OFDMA resource maps 316 indicate the HEW devices 104 allocated to the sub-channels 1 (610.2) through 16 (610.23), 17 (610.1, 610.4, 610.7, and 610.10) and 18 (610.15, 610.18, 610.21, and 610.24). For example, OFDMA resource map 316.2 indicates that the HEW device(s) 104 that are indicated by PAID5 602.6, PAID6 602.7, PAID7 602.8, and PAID8 602.9 are allocated the sub-channels 5 (610.8), 6 (610.9), 7 (610.11), and 8 (610.12), respectively, and "PART 1 OF 17" 602.10 is part of the allocation indication for the PAID for sub-channel 17 (610.1, 610.4, 610.7, and 610.10) with the other part of the PAID for sub-channel 17 part of 316.1 as "PART 2 of 17" 602.5.

The PAID5 602.6, PAID6 602.7, PAID7 602.8, and PAID8 602.9 may all indicate the same AID of a HEW device 104, in which case the HEW device 104 would be allocated all 20 MHz of sub-channels 5 (610.8), 6 (610.9), 7 (610.11), and 8 (610.12). If PAID5 602.6 and PAID6 602.7 indicated a first HEW device 104, and PAID7 602.8 and PAID8 602.9 indicated a second HEW device 104, then the first HEW device 104 would be allocated 10 MHz of 5 (610.8) and 6 (610.9), and the second HEW device 104 would be allocated 10 MHz of 7 (610.11) and 8 (610.12).

In example embodiments, the OFDMA resource maps 316 can be mixed with SDMA resource maps 318. For example, OFDMA resource map 316.4 may be a SDMA resource map 318 as illustrated in FIG. 5, in which case the HEW devices 104 indicated by the PAIDs 502 would occupy the entire 20 MHz sub-channel 13 610.19, 14 610.20, 15 610.22, and 16 610.23, each with a number of spatial streams indicated by NSTS 504. In example embodiments, if a SDMA resource map 318 is included in the HE-SIG 200, then one or more of the noncontiguous sub-channels may not be used because there would not be enough bits to specify the OFDMA resource map 316 for the noncontiguous sub-channel, e.g., as illustrated, sub-channel 17 610.1, 610.4, 610.7, and 610.10; and, sub-channel 18 610.15, 610.18, 610.21, and 610.24.

Figure 7:
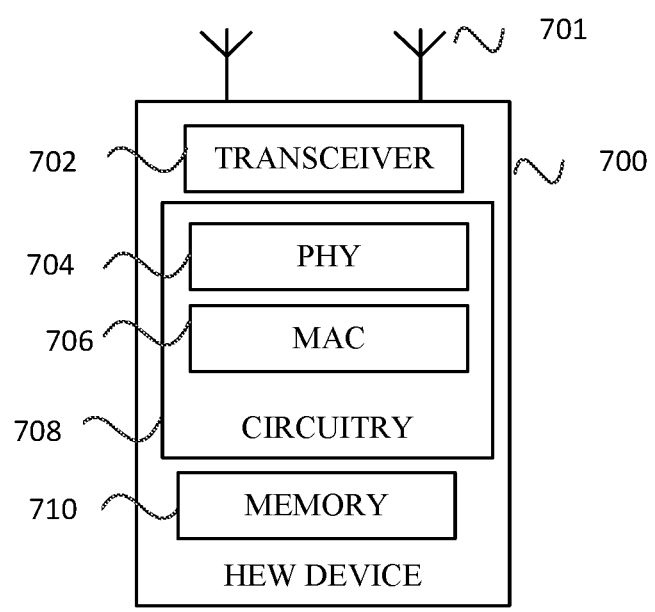
FIG. 7 illustrates a HEW device in accordance with some embodiments.

FIG. 7 illustrates a HEW device 700 in accordance with some embodiments. The HEW device 700 may be an HEW-compliant device that may be arranged to communicate with one or more other HEW devices, such as HEW devices 104 (FIG. 1) or access point 102 (FIG. 1) as well as communicate with legacy devices 106 (FIG. 1). The HEW devices 104 and legacy devices 106 may also be referred to as HEW stations (STAs) and legacy STAs, respectively. The HEW device 700 may be suitable for operating as access point 102 (FIG. 1) or an HEW device 104 (FIG. 1).

In accordance with embodiments, the HEW device 700 may include, among other things, a transmit/receive element (e.g., antenna) 701, a transceiver 702, physical layer (PHY) 704 circuitry and medium-access control layer circuitry (MAC) 706. PHY 704 and MAC 706 may be HEW-compliant layers and may also be compliant with one or more legacy IEEE 802.11 standards. MAC 706 may be arranged to configure PPDUs and arranged to transmit and receive PPDUs, among other things. HEW device 700 may also include other hardware processing circuitry 708 and memory 710 configured to perform the various operations described herein. The processing circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip. The circuitry 708 may perform processing.

In some embodiments, the MAC 706 may be arranged to contend for a wireless medium during a contention period to receive control of the medium for the HEW control period and configure an HEW PPDU. In some embodiments, the MAC 706 may be arranged to contend for the wireless medium based on channel contention settings, a transmitting power level, and a CCA level.

The PHY 704 may be arranged to transmit the HEW PPDU. The PHY 704 may include circuitry for modulation/ demodulation, upconversion/downconversion, filtering, amplification, etc. In some embodiments, the circuitry 708 may include one or more processors. The circuitry 708 may be configured to perform functions based on instructions being stored in a RAM or ROM, or based on special-purpose circuitry. In some embodiments, the circuitry 708 may be configured to perform one or more of the functions described herein in conjunction with FIGS. 1-6 such as sending and receiving HE-SIG fields and PPDUs.

In some embodiments, two or more antennas 701 may be coupled to the PHY 704 and arranged for sending and receiving signals including transmission of the HEW packets. The HEW device 700 may include a transceiver 702 to transmit and receive data such as HEW PPDU and packets that include an indication that the HEW device 700 should adapt the channel contention settings according to settings included in the packet. The memory 710 may store information for configuring the other circuitry to perform operations for configuring, transmitting, and receiving HE-SIG packets and performing the various operations described herein in conjunction with FIGS. 1-6.

In some embodiments, the HEW device 700 may be configured to communicate using OFDM communication signals over a multicarrier communication channel. In some embodiments, the HEW device 700 may be configured to communicate in accordance with one or more specific communication standards, such as the Institute of Electrical and Electronics Engineers (IEEE) standards including IEEE 802.11-2012, 802.11n-2009, IEEE 802.11ac-2013, IEEE 802.11ax, DensiFi, standards and/or proposed specifications for WLANs, or other standards as described in conjunction with FIG. 1, although the scope of the disclosed example embodiments is not limited in this respect as they may also be suitable to transmit and/or receive communications in accordance with other techniques and standards. In some embodiments, the HEW device 700 uses 4× symbol duration of IEEE 802.11n or 802.11ac.

In some embodiments, a HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or 802.16, or other device that may receive and/or transmit information wirelessly. In some embodiments, the HEW device 700 may include one or more of a keyboard, a display, a non-volatile memory port, multiple antennas, a graphics processor, an application processor, speakers, and other mobile device elements. The display may be an LCD screen including a touch screen.

The antennas 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701 may be effectively separated to benefit from spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an access point (AP) including circuitry. The circuitry may be configured to: determine a high-efficiency signal (HE-SIG) field for each of a plurality of sub-channels, wherein each HE-SIG field includes a common part and a sub-channel specific part; and transmit, in accordance with orthogonal frequency division multiple access (OFDMA), on each of the plurality of sub-channels, a corresponding HE-SIG field as a preamble to a physical layer convergence protocol (PLCP) protocol data unit (PPDU), wherein the sub-channel specific part of the corresponding HE-SIG field includes a resource map field to instruct a HE wireless local-area network (HEW) device to determine which portion of the PPDU to demodulate, and wherein the common part includes information of a format of the PPDU.

In Example 2, the subject matter of Example 1 can optionally include where the resource map field comprises four HEW device identifications that each indicate an allocation of one-quarter of a bandwidth of the corresponding sub-channel to HEW devices corresponding to the four HEW device identifications.

In Example 3, the subject matter of Examples 2 and 3 can optionally include where each sub-channel has a bandwidth of one from the following group: 20 MHz, 40 MHz, 80 MHz, 160 MHz, and 320 MHz.

In Example 4, the subject matter of any of Examples 1 through 3 can optionally include where each of the four HEW device identifications are one of the following group: an association identification (AID), a partial (AID) that is encoded with 11 bits to indicate an offset from a beginning AID determined by the HEW device, and a partial AID that is an encoding of the AID with fewer bits.

In Example 5, the subject matter of any of Examples 1 through 4 can optionally include where the resource map field further comprises a part of another sub-channel HE-SIG field.

In Example 6, the subject matter of any of Examples 1 through 5 can optionally include where the HE-SIG field indicates whether the resource map field is an OFDMA resource map field or a space division multiple-access (SDMA) resource map.

In Example 7, the subject matter of Example 6 can optionally include where the SDMA resource map comprises four HEW device identifications that each indicate a spatial stream allocation to the HEW devices corresponding to the four HEW device identifications.

In Example 8, the subject matter of any of Examples 1 through 7 can optionally include where the HE-SIG field includes an indication of a base server set identification (BSSID) that is encoded with fewer bits than a number of bits of a full BSSID.

In Example 9, the subject matter of Example 8 can optionally include where the circuitry is further configured to transmit a different portion of an encoding of the BSSID on two or more sub-channels of the plurality of sub-channels.

In Example 10, the subject matter of any of Examples 1 through 9 can optionally include where the AP is a HEW device.

In Example 11, the subject matter of Example 8 can optionally include where the AP operates in accordance with Institute for Electronic and Electrical Engineers (IEEE) 802.11 ax.

In Example 12, the subject matter of any of Examples 1 through 11 can optionally include where each of a plurality of HE-SIG fields is a fixed size independent of a number of HEW devices attached to the AP.

In Example 13, the subject matter of any of Examples 1 through 12 can optionally include where the HEW device further comprises memory and a transceiver coupled to the circuitry.

In Example 14, the subject matter of Example 13 can optionally include where the HEW device further comprises one or more antennas coupled to the transceiver.

Example 15 is a method for transmitting high-efficiency signal (HE-SIG) fields performed by an access point (AP). The method includes determining a high-efficiency signal (HE-SIG) field for each of a plurality of sub-channels, wherein each HE-SIG field includes a common part and a sub-channel specific part; and transmitting, in accordance with orthogonal frequency division multiple access (OFDMA), on each of the plurality of sub-channels, a corresponding HE-SIG field as a preamble to a physical layer convergence protocol (PLCP) protocol data unit (PPDU), wherein the sub-channel specific part of the corresponding HE-SIG field includes a resource map that enables a HE wireless local-area network (HEW) device to determine which part of the PPDU to demodulate.

In Example 16, the subject matter of Example 15 can optionally include where the resource map field comprises four HEW device identifications that each indicate an allocation of one-quarter of a bandwidth of the corresponding sub-channel to HEW devices corresponding to the four HEW device identifications.

In Example 17, the subject matter of Example 15 or Example 16 can optionally include where each sub-channel has a bandwidth of one from the following group: 20 MHz, 40 MHz, 80 MHz, 160 MHz, and 320 MHz.

In Example 18, the subject matter of Example 16 or Example 17 can optionally include where each of the four HEW device identifications are one of the following group: an association identification (AID), a partial (AID) that is encoded with 11 bits to indicate an offset from a beginning AID determined by the HEW device, and a partial AID that is an encoding of the AID with fewer bits.

Example 19 is a high-efficiency wireless local-area network (HEW) device including circuitry. The circuitry may be configured to receive, in accordance with orthogonal frequency division multiple access (OFDMA), on a sub-channel, a high-efficiency signal (HE-SIG) field as a preamble to a physical layer convergence protocol (PLCP) protocol data unit (PPDU); and demodulate the PPDU based on the HE-SIG field.

In Example 20, the subject matter of Example 19 can optionally include where the HE-SIG field comprises a plurality of identifiers, each identifier corresponding to a portion of the PPDU, and the circuitry may be further configured to demodulate each portion of the PPDU where the corresponding identifier identifies the HEW device.

In Example 21, the subject matter of Example 19 can optionally include where the plurality of identifiers are each one from the following group: an association identification (AID), a partial AID that is encoded with 11 bits to indicate an offset from a beginning AID determined by an access point that transmitted the PPDU, and a partial AID that is an encoding of the AID with fewer bits.

In Example 22, the subject matter of any of Examples 19 through 21 can optionally include where each sub-channel has a bandwidth of one from the following group: 20 MHz, 40 MHz, 80 MHz, 160 MHz, and 320 MHz.

In Example 23, the subject matter of any of Examples 19 through 22 can optionally include where the HE-SIG field includes an indication of a base server set identification (BSSID) that is encoded with fewer bits than a number of bits of a full BSSID, and wherein the circuitry may be further configured to compare the indication of the BSSID with the full BSSID and not demodulate the PPDU if the indication of the BSSID does not match the full BSSID.

Example 24 is a non-transitory computer-readable storage medium that stores instructions for execution by one or more processors to perform operations for transmitting high-efficiency signal (HE-SIG) fields on a high-efficiency wireless local-area network (HEW) device. The operations may configure the wireless device to determine a high-efficiency signal (HE-SIG) field for each of a plurality of sub-channels, wherein each HE-SIG field includes a common part and a sub-channel specific part; and transmit, in accordance with orthogonal frequency division multiple access (OFDMA), on each of the plurality of sub-channels, a corresponding HE-SIG field as a preamble to a physical layer convergence protocol (PLCP) protocol data unit (PPDU), wherein the sub-channel specific part of the corresponding HE-SIG field includes a resource map field that enables a HE wireless local-area network (HEW) device to determine which part of the PPDU to demodulate.

In Example 25, the subject matter of Example 24 can optionally include where the operations further configure the wireless device to transmit a first beacon on a primary channel in accordance with OFDMA, and transmit a second beacon on the plurality of sub-channels in accordance with OFDMA. The first beacon may be an Institute for Electronic and Electrical Engineers 802.11 legacy beacon and the second beacon is a HEW beacon.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP) comprising: a memory and processing circuitry coupled to the memory, the processing circuitry configured to:
encode a physical layer convergence protocol (PLCP) protocol data unit (PPDU), the PPDU comprising a high-efficiency signal (HE-SIG) field, the HE-SIG field comprising a plurality of portions, wherein each portion is separately encoded for a corresponding 20 MHz sub-channel of a plurality of 20 MHz sub-channels, and wherein each portion of the HE-SIG field comprises a plurality of station allocation fields and a common part indicating a format of the PPDU,
wherein each station allocation field of the plurality of station allocation fields includes a HE station identification (ID) field, and an indication of a modulation and coding scheme (MCS), and
wherein a position of a station allocation field within the plurality of station allocation fields indicates a position of a resource for a corresponding station within a plurality of resources of the corresponding 20 MHz sub-channel, wherein the plurality of resources is indicated by the format of the PPDU; and
cause the HE AP to wirelessly transmit the PPDU on each 20 MHz subchannel of the plurality of the 20 MHz sub-channels.

2. The apparatus of claim 1, wherein the PPDU further comprises a bandwidth field, wherein a value of the bandwidth field indicates a bandwidth of the PPDU.

3. The apparatus of claim 2, wherein the value of the bandwidth field indicates a bandwidth of 20 MHz, 40 MHz, 80 MHz, or 160 MHz.

4. The apparatus of claim 1, wherein the processing circuitry is configured to:
cause the HE AP to simultaneously transmit each portion of the plurality of portions within a corresponding 20 MHz sub-channel of the plurality of 20 MHz sub-channels.

5. The apparatus of claim 1, wherein each station allocation field further comprises a spatial streams field, wherein a value of the spatial streams field indicates a number of spatial streams assigned to a HE station identified by the HE station ID of a corresponding station allocation field.

6. The apparatus of claim 1, wherein the HE station ID is 11 bits.

7. The apparatus of claim 1, wherein a value of the MCS indicates a MCS used to encode data of a corresponding resource.

8. The apparatus of claim 1, wherein each portion of the HE-SIG field is part of a preamble to the PPDU.

9. The apparatus of claim 1, wherein the PPDU further comprises a duration field, wherein a value of the duration field indicates a duration of the PPDU.

10. The apparatus of claim 1, wherein the PPDU further comprises a basic service set (BSS) identification field, wherein a value of the BSS identification field indicates the HE AP.

11. The apparatus of claim 1, wherein the HE station ID may be duplicated in two or more station allocation fields of the plurality of station allocation fields.

12. The apparatus of claim 1, wherein the processing circuitry is further configured to:
encode each portion of the HE-SIG field with a plurality of data fields in accordance with a corresponding plurality of allocation fields.

13. The apparatus of claim 1, wherein a HE station identified by the HE station ID and the HE AP are configured to operate in accordance with one or more from the following group: an Institute of Electrical and Electronic Engineers (IEEE) 802.11ax and IEEE 802.11.

14. The apparatus of claim 1, further comprising: transceiver circuitry coupled to the processing circuitry; and, one or more antennas coupled to the transceiver circuitry.

15. A non-transitory computer-readable storage medium that stores instructions for execution by one or more processors of an apparatus of a high-efficiency (HE) access point (AP), the operations to configure the one or more processors to:
encode a physical layer convergence protocol (PLCP) protocol data unit (PPDU), the PPDU comprising a high-efficiency signal (HE-SIG) field, the HE-SIG field comprising a plurality of portions, wherein each portion is separately encoded for a corresponding 20 MHz sub-channel of a plurality of 20 MHz sub-channels, and wherein each portion of the HE-SIG field comprises a plurality of station allocation fields and a common part indicating a format of the PPDU,
wherein each station allocation field of the plurality of station allocation fields includes a HE station identification (ID) field, and an indication of a modulation and coding scheme (MCS), and wherein a position of a station allocation field within the plurality of station allocation fields indicates a position of a resource for a corresponding station within a plurality of resources of the corresponding 20 MHz sub-channel, wherein the plurality of resources is indicated by the format of the PPDU; and cause the RE AP to wirelessly transmit the PPDU on each 20 MHz subchannel of the plurality of the 20 MHz sub-channels.

16. The non-transitory computer-readable storage medium of claim 15, wherein the PPDU further comprises a bandwidth field, wherein a value of the bandwidth field indicates a bandwidth of the PPDU.

17. The non-transitory computer-readable storage medium of claim 15, wherein each station allocation field further comprises a spatial streams field, wherein a value of the spatial streams field indicates a number of spatial streams assigned to a HE station identified by the HE station ID of a corresponding station allocation field.

18. A method performed by an apparatus of a high-efficiency (HE) access point (AP), the method comprising:

encoding a physical layer convergence protocol (PLCP) protocol data unit (PPDU), the PPDU comprising a high-efficiency signal (HE-SIG) field, the HE-SIG field comprising a plurality of portions, wherein each portion is separately encoded for a corresponding 20 MHz sub-channel of a plurality of 20 MHz sub-channels, and wherein each portion of the HE-SIG field comprises a plurality of station allocation fields and a common part indicating a format of the PPDU, wherein each station allocation field of the plurality of station allocation fields includes a HE station identification (ID) field, and an indication of a modulation and coding scheme (MCS), and wherein a position of a station allocation field within the plurality of station allocation fields indicates a position of a resource for a corresponding station within a plurality of resources of the corresponding 20 MHz sub-channel, wherein the plurality of resources is indicated by the format of the PPDU; and causing the HE AP to wirelessly transmit the PPDU on each 20 MHz subchannel of the plurality of the 20 MHz sub-channels.

19. The method of claim 18, wherein each station allocation field further comprises a spatial streams field, wherein a value of the spatial streams field indicates a number of spatial streams assigned to a HE station identified by the HE station ID of a corresponding station allocation field.

20. An apparatus of a first high-efficiency (HE) station, the apparatus comprising: a memory and processing circuitry coupled to the memory, the processing circuitry configured to:

decode a physical layer convergence protocol (PLCP) protocol data unit (PPDU), the PPDU comprising a high-efficiency signal (HE-SIG) field, the HE-SIG field comprising a plurality of portions, wherein each portion is separately encoded for a corresponding 20 MHz sub-channel of a plurality of 20 MHz sub-channels, and wherein each portion of the HE-SIG field comprises a plurality of station allocation fields and a common part indicating a format of the PPDU, wherein each station allocation field of the plurality of station allocation fields includes a HE station identification (II)) field and an indication of a modulation and coding scheme (MCS), and wherein a position of a station allocation field within the plurality of station allocation fields indicates a position of a resource for a corresponding station within a plurality of resources of the corresponding 20 MHz sub-channel, wherein the plurality of resources is indicated by the format of the PPDU; and when the HE station ID field indicates an ID of the HE station, decode data in accordance with a corresponding resource and a corresponding MCS.

21. The apparatus of claim 20, wherein the PPDU further comprises a common field, wherein the common field indicates a bandwidth of the plurality of 20 MHz channels.

22. The apparatus of claim 20, wherein a value of a corresponding MCS field of the corresponding allocation field indicates a MCS used to decode the data.

23. The apparatus of claim 20, wherein the HE station ID is 11 bits.

24. The apparatus of claim 20, further comprising transceiver circuitry coupled to the processing circuitry; and, one or more antennas coupled to the transceiver circuitry.

\* \* \* \* \*

UNITED STATES PATENT AND TRADEMARK OFFICE
CERTIFICATE OF CORRECTION

| | |
|---|---|
| PATENT NO. | : 10,630,456 B2 |
| APPLICATION NO. | : 15/840776 |
| DATED | : April 21, 2020 |
| INVENTOR(S) | : Stacey et al. |

Page 1 of 1

It is certified that error appears in the above-identified patent and that said Letters Patent is hereby corrected as shown below:

In the Claims

In Column 13, Line 9, in Claim 15, delete "RE AP" and insert --HE AP-- therefor

In Column 14, Line 20, in Claim 20, delete "(II))" and insert --(ID)-- therefor

Signed and Sealed this
Fifth Day of January, 2021

Andrei Iancu
*Director of the United States Patent and Trademark Office*